Figure 3:
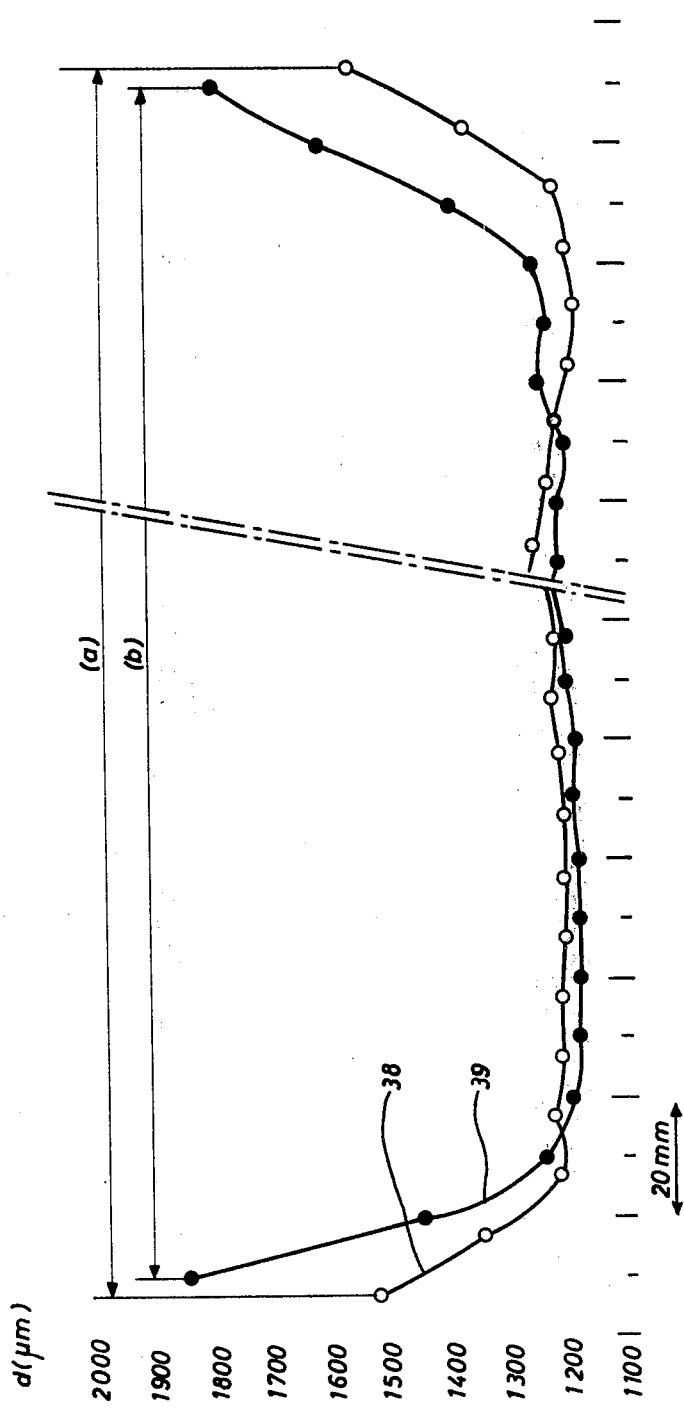

United States Patent [19]

De Geest et al.

[11] 4,166,089
[45] Aug. 28, 1979

[54] CORONA FREE PINNING OF EXTRUDED POLYMER FILM

[75] Inventors: Wilfried F. De Geest, Berchem; Paul A. Verkinderen, Edegem; Felix F. De Smedt, Wilrijk, all of Belgium

[73] Assignee: AGFA-GEVAERT N.V., Mortsel, Belgium

[21] Appl. No.: 677,816

[22] Filed: Apr. 16, 1976

Related U.S. Application Data

[63] Continuation of Ser. No. 492,184, Jul. 26, 1974, abandoned, which is a continuation of Ser. No. 347,667, Mar. 30, 1973, abandoned, which is a continuation of Ser. No. 88,555, Nov. 12; 1970, abandoned.

[30] Foreign Application Priority Data

Nov. 13, 1969 [GB] United Kingdom ............... 55708/69

[51] Int. Cl.² ...................... B29D 7/02; B29C 17/00; H05B 7/00

[52] U.S. Cl. ..................... 264/22; 264/216; 425/174.8 E

[58] Field of Search ................ 264/22, 216, 24, 212, 264/213; 156/272, 380; 425/174.8 E; 361/234

[56] References Cited

U.S. PATENT DOCUMENTS

| | | | |
|---|---|---|---|
| 2,187,306 | 1/1940 | Formhals | 425/174.8 E |
| 3,319,309 | 5/1967 | Owens | 156/272 |
| 3,427,686 | 2/1969 | Busby | 264/24 |
| 3,520,959 | 7/1970 | Busby | 264/22 |

*Primary Examiner*—James B. Lowe
*Attorney, Agent, or Firm*—William J. Daniel

[57] ABSTRACT

The adhesion or pinning of an extruded film forming polymer to a moving quenching member is improved, in the absence of corona discharge, by maintaining the quenching member at an electrical potential while the extrusion die is grounded, one magnitude of said potential being sufficient to increase the adherence of the film to the quenching member.

7 Claims, 4 Drawing Figures

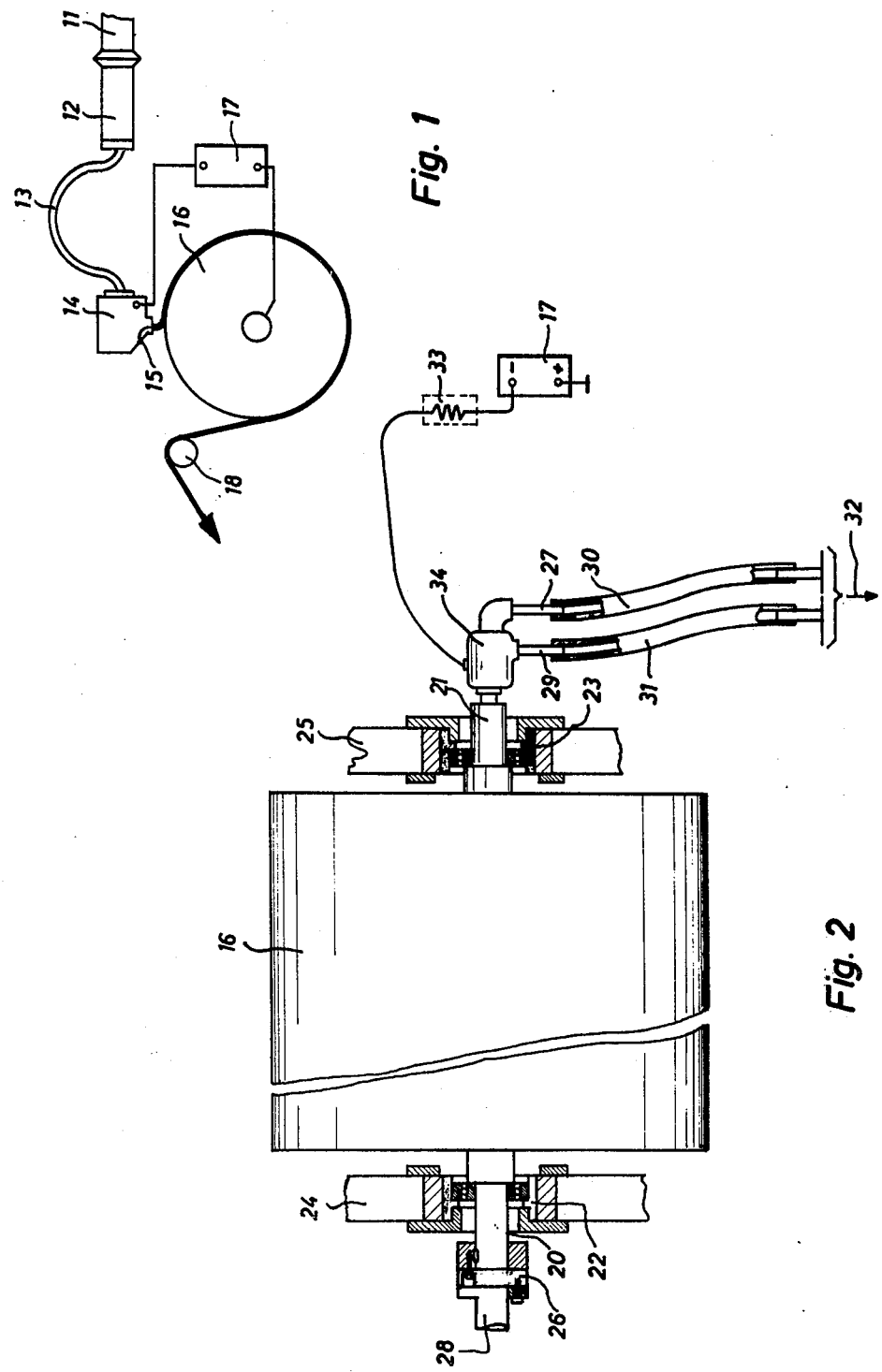

CORONA FREE PINNING OF EXTRUDED POLYMER FILM

This application is a continuation of Ser. No. 492,184 filed July 26, 1974, now abandoned; which was a continuation of Ser. No. 347,667 filed Mar. 30, 1973, now abandoned; which was a continuation of Ser. No. 88,555 filed Nov. 12, 1970, now abandoned.

The present invention relates to a process for producing polymeric film by the extrusion of a thermoplastic film forming polymer.

A common method for producing thermoplastic polymeric film is to extrude the polymeric material while molten through a flat or circulat extrusion die. After extrusion, the resulting molten or plastic polymeric film is cast upon a moving cooling or quenching surface constituted by a cooled drum or belt, where the film is cooled sufficiently to solidify it. In order to obtain a rapid quenching of the film, it is important that the heat transfer from the film to the quenching surface be high.

Good heat transfer may be obtained when the film is securely adhered to the quenching surface by depositing electrostatic charges to the upper surface of the molten film from a corona-discharge station, prior to the point where the film first contacts with its lower surface the quenching surface which is electrically grounded. The industrial application of the described process is hampered by the phenomenon which is inherent to ionization discharging, viz. the tendency to change into arcing under certain circumstances of relative humidity, air pressure, etc. As a consequence thereof the film will be punctured or ruptured.

In addition, the corona discharge electrode tends to collect oligomers which are set free during the extrusion, so that the ionization may become non-uniform along the length of the electrode.

The present invention provides an improved process for producing polymeric film, which operates without corona discharge, and yet obtains a good adhesion of the extruded film to the quenching member.

The process for producing film according to the present invention comprises extruding a thermoplastic, film-forming, polymeric material in the form of a continuous film from an extrusion die onto a moving quenching member while maintaining an electrical potential difference between said quenching member and some other part which is contacted by the polymeric material before it reaches said member, the magnitude of such difference being sufficient to improve the adherence of said film to said quenching member, and withdrawing the solidified film from said quenching member.

By way of example an electrical potential difference can be established between the quenching member and the extrusion die. Processes will be described hereinafter wherein the molten polymeric material after leaving the extrusion die travels in contact with a control surface (e.g., a control roller surface) before reaching the quenching member. In such a process the required results can be achieved by maintaining an electrical potential difference between the quenching drum and said control surface; in those circumstances there may also exist an electrical potential difference between the quenching member and the extrusion die, and/or between the extrusion die and the control surface but that is not essential.

The process can be carried out according to one simple embodiment, by connecting one terminal of an electric power supply to the quenching member and the other terminal to the extrusion die or some other part in contact with the polymeric material flowing towards such member. The die (or other said member) and the quenching member, may be electrically insulated from each other or there may be some flow of current between them, e.g., via the extruded molten film. In a preferred embodiment, the extrusion die is electrically grounded and the quenching member is electrically insulated with respect to its mountings, i.e., from the ground, and is connected galvanically to one terminal of a source of D.C. potential. As mentioned already hereinbefore, the quenching member with may be a roller, a belt or the like. In the case of a roller, for instance, the roller may be integrally electrically conductive, or it may comprise an insulating body portion which is provided with an electrically conductive peripheral portion. As a further alternative the quenching member may have an electrically conductive body portion provided with a thin electrically insulating peripheral surface layer.

The improvement of the present invention may be practiced in the context of the process disclosed in commonly assigned U.S. Pat. No. 4,006,729 which issued Jan. 3, 1978 on Ser. No. 506,574, which was a continuation of Ser. No. 319,015, now abandoned, which in turn was a continuation of Ser. No. 43,484, now abandoned, and corresponds to British Pat. No. 1,316,411. Those applications relate to a method for making polymeric film by extrusion wherein molten polymeric material is extruded through a slot orifice to form a film, the extruded film is longitudinally stretched by being drawn away from the extrusion orifice faster than the extrusion speed and is received on a quenching surface and, between the extrusion orifice and the quenching surface, the extruded film makes contact over its full width with a cooled control surface, which abruptly arrests the necking-in of the film.

As described in the specifications of those earlier applications there may be more than one quenching member. For example there may be a plurality of quenching drums or other quenching members arranged in series so that the film passes from one to the other of them. The term "quenching member" as used in defining the present invention thus used broadly so as to include any one of two or more such members if more than one such member is present. In such a case, in which there is more than one quenching member, the two or more members being arranged in series, each of the members may be at a potential different from that of some part contacted by the polymer flowing towards the first of said members but in any case it is preferable for at least the first of the said members to be at a said difference potential.

An additional advantage of the process according to the invention is that only a small current (if any) is required in the electric circuit incorporating the source of E.M.F. In case there is a closed circuit, current limiting means may be incorporated in such circuit for limiting the current to a maximum value of about $1 \times 10^{-6}$ A. Moreover, there is virtually no danger to human operators carrying out a process according to the present invention, as a result of electric discharge because, in case the extrusion die is grounded, the capacity of the quenching member in relation to the ground is so small that, even for a D.C. potential of one thousand volts, the energy of the quenching member amounts only to a value of about $1 \times 10^{-6}$ joules. Finally, it is possible to avoid even a slight shock in the event of the quenching member is touched by providing the lateral sides of the quenching member, and optionally also the surface thereof which is contacted by the extruded film, with a thin electrically insulating layer.

Figure 4:
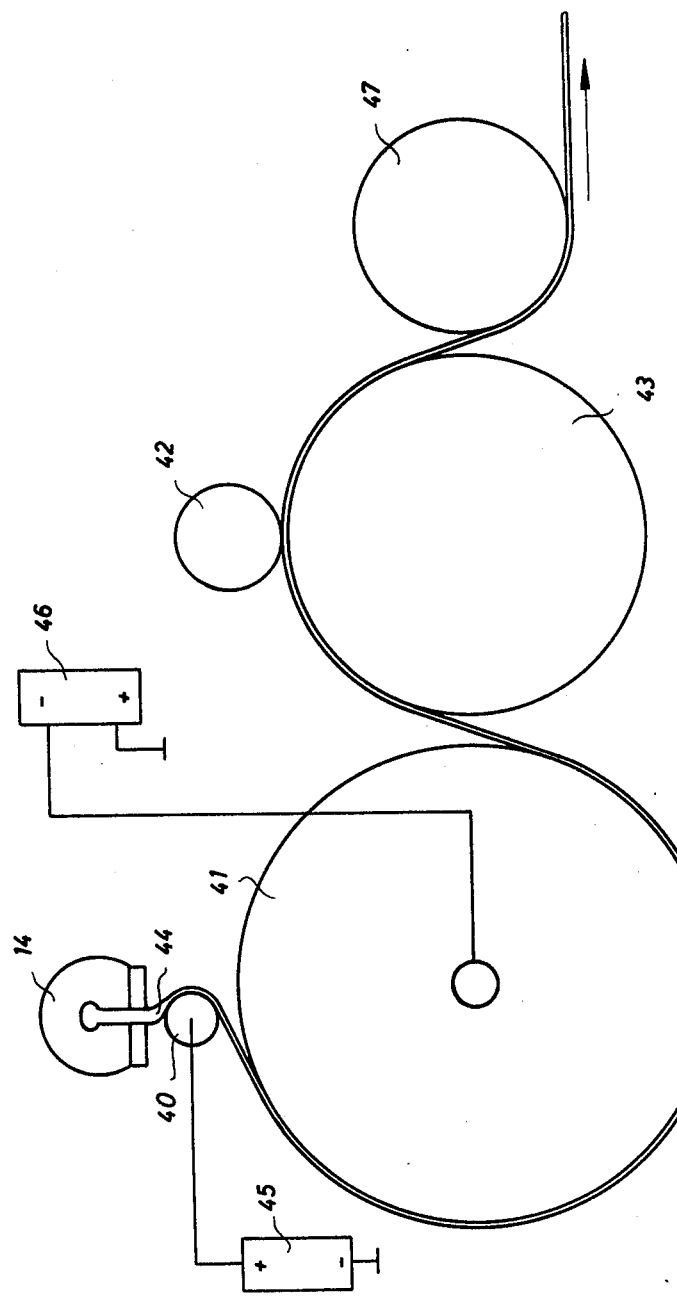

The invention will be described hereinafter with reference to the accompanying drawings wherein:

FIG. 1 is a diagrammatic view of the extrusion arrangement operating according to the method of the present invention, FIG. 2 is a front view, partly broken away, of the quenching roller, FIG. 3 is a diagram representing the influence of the applied potential difference across the width and the edge thickness of the cooled film, FIG. 4 is a diagrammatic view of an alternative extrusion arrangement.

Referring to FIG. 1, molten synthetic thermoplastic film forming polymeric material is extruded by an extruder 11, forced through a filter 12 and a conduit 13 to the extrusion die 14, and through the orifice 15 of the die onto a positively driven quenching drum 16, rotated by means not shown. Between the quenching drum and the extrusion die a potential difference is supplied from a D.C. power supply 17. The solidified film is drawn off the quenching drum, e.g. over a non-driven roller 18, and may be submitted to further treatments to improve its physical properties. Such treatments are known in the art and may include longitudinal and transverse stretching, heat-setting, post-stretching, heat-relaxing, etc.

While FIG. 1 shows the principle of carrying out the process according to the present invention, FIG. 2 adds some more practical details.

The quenching drum 16 is a stainless steel hollow member, the peripheral surface of which is highly polished and has a mirrorlike finish.

The drum has two fixed shaft extremities 20 and 21 which are rotatably journalled in ball bearings, as shown. The ball bearings are pressed into bushings 22 and 23 of an electrically insulating material, such as Teflon (Registered Trademark) or the like, and the bushings in their turn are fixedly clamped in the parts 24 and 25 of the machine frame. The shaft extremity 20 is coupled via an insulating coupling 26, also made of Teflon, to the drive shaft 28, whereas the shaft extremity 21 is hollow and communicates through a rotatable seal with the inlet 27 and the outlet 29 for cooling liquid. The inlet and the outlet are connected by flexible insulating conduits 30 and 31 to an arrangement, indicated by the arrow 32, and comprising a circulation pump and a cooling group.

The cooling liquid used in the arrangement described was a mixture of 2 parts by volume of paraffin oil and 1 part of trichloroethylene. The mixture showed a specific resistivity of $10^{11}$ ohm.cm.

The power supply 17 is a D.C. power supply capable of delivering high tension voltages ranging between 0 and 5000 volts. One output terminal of the supply is grounded, whereas the other terminal is connected to the electrically conductive connection 34 of the conduits of cooling liquid, and in that way is galvanically connected to the quenching drum 16. The D.C. output of the power supply used in the present arrangement was electronically stabilized so that in fact it shows a low internal resistance. Therefore a protective series resistor was provided in the supply, shown as a separate resistor 33 in the figure, resistor 33 having a resistance of $10^9$ ohms in the example which will be described hereinafter.

The extrusion die 14, the idler roller 18 and all other parts of the installation are electrically grounded.

The following example illustrates the invention.

A polyethylene terephthalate polymer having an inherent viscosity of 0.59 dl.g$^{-1}$ and a specific density of 1.33 g.cm$^{-3}$ is extruded at a rate of 60 kgh$^{-1}$ and at a temperature of 290° C. through a conventional flat extrusion die having an opening of 300 mm by 200 mm. The molten polymer is received on a quenching drum having a diameter of 800 mm and a width of 1100 mm, which is rotated at a rate of 2.28 m.min$^{-1}$ and is maintained at a temperature of about 30° C.

The effective length of the molten film between the extrusion orifice and the first line of contact with the drum amounts to 20 mm.

The thickness of the film in the transverse direction is measured after removal of the solidified film from the quenching drum and is plotted in FIG. 3, in which the curve 38 represents the thickness d of the film in relation to its width when the D.C. potential of the source was adjusted to 1000 volts, and curve 39 indicates the film thickness, when the potential was reduced to zero.

It appears from the diagram of FIG. 3, that the application of the potential difference causes the film width to increase (value a) by about 6 mm from its value (value b) when there is no potential difference. This increase in the film width implies a reduction of necking-in which means that the film edges have become thinner so that the edge loss, i.e. the quantum of film material where the film thickness exceeds the central film thickness by 1% and which must be trimmed off, is reduced.

The effect of the applied potential difference on the so-called "Venetian blind haze" defect, i.e. a type of haze which is characterized by a plurality of alternate clear and hazy lines and is believed to result from entrapment of air between the film and the quenching surface, was evaluated visually.

When the potential difference was zero, the mentioned defect was so strong that after biaxial stretching, heat-setting and heat-relaxing, a film was obtained with a surface quality which although acceptable for the production of radiographic film, was totally unacceptable for the production of photographic film for graphic purposes.

When the potential difference was 400 volts, the mentioned defect had almost completely disappeared except for a plurality of small "hole" defects which were distributed at random at an average density of about two per cm$^2$. These hole defects could be characterized as small circular cavities in the film surface which was in contact with the quenching drum, having a diameter of about 0.1 mm and an undeterminable small depth.

When the potential difference was increased to 500 volts, the Venetian blind haze had completely disappeared and the hole defects were slightly reduced in number and in size.

As the potential difference was progressively increased, the hole defect decreased correspondingly until at potential difference of 1000 volts a visually perfectly smooth film was obtained.

In the operation of the extrusion arrangement described, a D.C. current was measured in the connection of the power supply to the quenching drum of $0.1 \times 10^{-6}$ A, so that the actual voltage on the quenching drum amounts to 900 volts (i.e. $1000 - 10^9 \times 0.1 \times 10^6$).

The current flowing through the mentioned connection is actually the sum of three currents flowing separately to the ground. The first current flows from the quenching drum through the molten film to the grounded extrusion die. The second current flows through the film, removed from the drum, to the grounded roller 18. The third current flows from quenching drum through the bearing insulations, and through the cooling circuit to the grounded machine parts.

The second current is negligible in respect of the first one, because the length of the free film path to the roller 18 is several times greater than the length of the free film path to the extrusion die 15, and the conductivity of the cooled film is much lower than the molten film.

The third current is negligible also, because the electric insulation of the quenching drum in respect of the ground amounted to $10^{12}$ ohms. In this connection it should be mentioned that the electrically insulating, as well as the thermally conductive, properties of the described cooling liquid mixture, remained satisfactory over long periods of use.

From the above it may thus be concluded that the electric conductivity of the molten film is the main parameter which determines the current in the electric circuit. This conclusion does not hold when there is no galvanic contact between the film and the quenching drum, such as occurs when the drum surface is covered with an electrically insulating layer. Such layer may be formed by the deposition of oligomers, or it may be deliberately provided in order to prevent the operator from touching the charged drum. Although the current in the circuit is virtually reduced to zero by such insulating layer, it has been found that the favourable effect of the electric potential difference on the adherence of the film to the quenching drum remains unaffected.

It should be understood, however, that the presence of such insulating layer on the drum surface will generally have an adverse effect on the heat transfer, so that it is preferably neither applied nor allowed to form.

In connection with the electrical danger formed by the described arrangement, it can be mentioned that the operator could touch the quenching drum at a potential of 900 volts without experiencing any shock. This is explained by the presence of resistor 33 in the electric circuit which limits the maximum current to $1 \times 10^{-6}$ A, and the electric energy stored in the drum which amounts only to $1 \times 10^{-6}$ joules ($\frac{1}{2}CV^2 = \frac{1}{2} \cdot 2 \times 10^{-12} \times 10^6$, wherein C is the capacity of the drum versus the ground and V is the potential difference).

The invention is not limited to the described embodiment. The polarity of the D.C. power supply may be reversed without any adverse effect on the process.

The power supply may provide an A.C. voltage but in that case the frequency of the A.C. voltage must be not so high that most of the electric energy is lost in undesirable capacitive coupling with machine parts. Moreover, the frequency of the A.C. should differ from the proper resonance frequency of the molten film curtain in order to not disadvantageously influence the process.

The potential difference may also be applied by electrically grounding the quenching drum and by connecting the extrusion die 14 to the power supply, the flexible connection 13 providing in that case an electric insulation between the extrusion die and the other, grounded, extruder parts. Alternatively, the quenching drum and the extrusion die may both be electrically insulated from ground and connected each to a terminal of the power supply, the grounding occurring at a potential between those of the power supply terminals.

The means for cooling the extruded film may comprise more than one quenching member as mentioned already in the introduction of the description, and in that case all of such members may be maintained at a potential differing from that of the extrusion die. If a cooled control roller with a small diameter, as described in the above-identified U.S. Pat. No. 4,066,729, is made to contact the extruded film at its concave side between the extrusion die and the quenching drum, this roller may be connected to the electric power supply in order to give that control roller a potential different in magnitude or in magnitude and polarity from that of the quenching drum. Such control roller may also have a potential different from the extrusion die as well as from the quenching drum, and such an embodiment is illustrated in FIG. 4.

A film 44 which is extruded from an electrically grounded die 14 is drawn over a free rotating control roller 40 by a positively driven quenching drum 41 which rotates at a peripheral velocity which is several times higher than the speed of the film being extruded from the die. The control roller is cooled and has a high heat conductivity, so that the stretching of the molten film is confined to the gap between the extrusion orifice and the control roller. The film is carried on the surface of the drum 41 for an extended portion of its travel and is then fed to a second driven quenching drum 43. A roller 42 covered with a resilient layer presses the film on the periphery of the drum 43 in view of the proper advance of the film. Finally, the film is drawn away over a drum 47 to a further destination.

The rollers 40 and 41 are mounted in electrically insulated fashion and are galvanically connected to electrically grounded D.C. supply means 45 and 46. The polarity of one supply is inverted with respect to the other, so that the difference in potential is highest between the control roller 40 and the quenching drum 41.

As an alternative, the control roller may be at a potential equal to that of the quenching drum and the required electrical potential difference may be established between the extrusion die on the one hand and the quenching member on the other.

Of course it is possible to ground the control roller and to maintain the quenching member at a difference potential and the extrusion die can then be at a potential equal to or different from that of the control roller.

Finally, it should be understood that the method according to the invention may be used with success in the extrusion of films of other polymeric materials which are cooled rapidly upon extrusion. Some representative materials are polyethylene, polypropylene, copolymers thereof, polystyrene, polyvinylchloride and others.

We claim:

1. A process for producing polymer film by the steps consisting essentially of:
   (a) extruding a molten thermoplastic, film forming, polymeric material from an electrically grounded extrusion die to produce a continuous film,
   (b) continuously delivering said extruded film onto the surface of a rotatable electrically conductive cooling cylinder electrically insulated from ground, and establishing an intimate adherence between said film and said cooling cylinder surface at the initial locus of contact of the film with the roller by connecting said roller to a source of electrical potential, said potential being of sufficient magnitude to increase the adherence of the film to said roller surface but insufficient to produce a corona discharge in the vicinity of said locus, and (c) removing the film from said cooling roller after the film remained in contact therewith for a determined angular extent.

2. A process according to claim 1, wherein there is at least one quenching drum of larger diameter than said cylinder for cooling the film after removal from said first cooling cylinder, said quenching drum being likewise mounted electrically insulated from ground and connected to a second source of electrical potential.

3. A process according to claim 2, wherein the polarity of said second source of electrical potential is opposite to the polarity of said first source of potential.

4. A process according to claim 2, wherein the time during which the film remains in contact with said quenching drum is substantially greater than the time during which the film remains in contact with said cooling cylinder.

5. A process according to claim 2, wherein the film remains in contact with said quenching drum over an angular extent which is substantially greater than the angular extent of contact with said cooling cylinder.

6. A process according to claim 1, wherein the current flowing from the source of electrical potential towards said cooling cylinder is limited to a maximum of about $1 \times 10^{-6}$ A.

7. A process according to claim 1, wherein said polymeric material is polyethylene terephthalate.

* * * * *